US008749567B2

(12) United States Patent
Min et al.

(10) Patent No.: US 8,749,567 B2
(45) Date of Patent: Jun. 10, 2014

(54) APPARATUS FOR AND METHOD OF PROCESSING VERTEX

(75) Inventors: Kyoung-june Min, Yongin-si (KR); Chan-min Park, Seongnam-si (KR); Won-jong Lee, Suwon-si (KR); Gyeong-ja Jang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 937 days.

(21) Appl. No.: 12/076,272

(22) Filed: Mar. 14, 2008

(65) Prior Publication Data

US 2009/0073163 A1   Mar. 19, 2009

(30) Foreign Application Priority Data

Sep. 14, 2007  (KR) .................. 10-2007-0093849

(51) Int. Cl.
*G06F 13/00* (2006.01)
*G09G 5/00* (2006.01)
*G06F 13/28* (2006.01)
*G06F 12/00* (2006.01)

(52) U.S. Cl.
USPC ........... 345/537; 345/536; 345/581; 345/619; 710/22; 710/33; 710/35; 711/100; 711/154; 711/167; 711/168

(58) Field of Classification Search
USPC .................. 345/530–574, 581–588, 619; 710/22–28, 33, 35; 711/100, 154, 167, 711/168

See application file for complete search history.

(56) References Cited

U.S. PATENT DOCUMENTS

| 5,801,714 | A  | * | 9/1998 | Holt ........................... 345/501 |
| 6,184,908 | B1 | * | 2/2001 | Chan et al. .................. 345/522 |
| 6,778,174 | B1 | * | 8/2004 | Fox et al. .................... 345/506 |
| 2003/0112247 | A1 | * | 6/2003 | Lu ............................. 345/531 |
| 2003/0142104 | A1 |  | 7/2003 | Lavelle et al. |
| 2006/0061577 | A1 | * | 3/2006 | Subramaniam ........... 345/501 |
| 2007/0162649 | A1 |  | 7/2007 | Wang et al. |

FOREIGN PATENT DOCUMENTS

| JP | 4-305755 | 10/1992 |
| JP | 2006-99774 | 4/2006 |
| KR | 10-2007-0008077 | 1/2007 |
| KR | 10-2007-0055610 | 5/2007 |

OTHER PUBLICATIONS

Korean Office Action issued May 30, 2013 in corresponding Korean Patent Application No. 10-2007-0093849.

* cited by examiner

*Primary Examiner* — Wesner Sajous
*Assistant Examiner* — Andrew Shin
(74) *Attorney, Agent, or Firm* — Staas & Halsey LLP

(57) ABSTRACT

An apparatus for and method of processing a vertex in relation to 3 dimensional (3D) graphics pipeline are provided. According to the method, while a processor processes vertex data in units of batches, vertex data corresponding to a batch to be processed next is extracted and temporarily stored in a buffer independently of the processor. If the processor finishes processing of the current batch, the batch stored in the buffer is output so that the processor can immediately process the batch.

16 Claims, 4 Drawing Sheets

APPARATUS FOR AND METHOD OF PROCESSING VERTEX

CROSS-REFERENCE TO RELATED PATENT APPLICATIONS

This application claims the benefit of Korean Patent Application No. 10-2007-0093849, filed on Sep. 14, 2007, in the Korean Intellectual Property Office, the disclosure of which is incorporated herein in its entirety by reference.

BACKGROUND OF THE INVENTION

1. Field of the Invention

The present invention relates to a 3 dimensional (3D) graphics pipeline, and more particularly, to an apparatus for and method of more efficiently performing stream processing when multimedia data is processed based on a processor.

2. Description of the Related Art

FIG. 1 is a block diagram of part of a 3 dimensional (3D) graphics pipeline according to conventional technology, which can selectively include a model-view transform unit 100, a clipping unit 120, a viewpoint mapping unit 130, a lighting unit 105, and a back-face culling unit 110.

The model-view transform unit 100 transforms vertex data into a 3D viewing coordinate system, and the lighting unit 105 applies light and reflectance to the viewing system. The back-face culling unit 110 performs back-face culling. The clipping unit 120 removes in units of triangles, vertex data that is not seen in a view volume. The viewpoint mapping unit 130 performs viewpoint transform.

When vertex data is processed, this conventional 3D graphics pipeline processes vertex data processes vertex data for each element according to a pipeline fashion. However, when each element of this conventional 3D graphics pipeline is implemented in a processor, it is relatively inefficient compared to a loop fashion in which vertex data is collected in units of batches and processed repeatedly.

Also, if it is assumed that a batch constructor unit 400 which arranges vertex data in units of batches in advance like a 3D graphics pipeline as illustrated in FIG. 4 is additionally disposed before processing data in the 3D graphics pipeline illustrated in FIG. 1 and each element processes vertex data in units of batches in the loop fashion, random memory accesses that occur simultaneously in many places are excessively required, thereby considerably delaying processing and increasing a processing time.

SUMMARY OF THE INVENTION

The present invention provides an apparatus and method by which while a processor processes vertex data in units of batches, vertex data corresponding to a batch to be processed next is extracted and temporarily stored in a buffer independently of the processor, and if the processor finishes processing of the current batch, the batch stored in the buffer is output so that the processor can immediately process the batch.

According to an aspect of the present invention, there is provided an apparatus for processing vertex data including: a first storage unit storing vertex data; a second storage unit storing vertex data corresponding to a preset processing unit among the stored vertex data; a processing unit processing the vertex data stored in the second storage unit; and an extraction unit which while the processing unit processes the vertex data stored in the second storage unit, extracts vertex data corresponding to the preset unit to be processed next from the first storage unit, and if all the vertex data stored in the second storage unit is processed, outputs the extracted vertex data to the second storage unit.

According to another aspect of the present invention, there is provided an apparatus for processing vertex data including: a storage unit storing vertex data; a processing unit processing vertex data in preset processing units; and an extraction unit extracts vertex data of an amount corresponding to the processing unit to be processed next from the stored vertex data while the vertex data processing unit processes vertex data.

According to another aspect of the present invention, there is provided an apparatus for processing vertex data including: a data extraction unit extracting vertex data corresponding to a preset processing unit to be processed next while vertex data is processed in a processor; a temporary storage unit temporarily storing the extracted vertex data; and an output unit, if the vertex data in the processor is all processed, outputting the temporarily stored vertex data to a memory which temporarily stores data in order for the processor to process data.

According to another aspect of the present invention, there is provided a method of processing vertex data including: extracting vertex data corresponding to a preset processing unit to be processed next while vertex data is processed; if the processing of the vertex data being processed is finished, outputting the extracted vertex data; and processing the output vertex data.

According to another aspect of the present invention, there is provided a method of extracting vertex data including: extracting vertex data corresponding to a preset processing unit to be processed next while a processor processes vertex data; temporarily storing the extracted vertex data; and if the processing of the vertex data in the processor is all finished, outputting the temporarily stored vertex data to a memory which temporarily stores data in order for the processor to process data.

According to another aspect of the present invention, there is provided a computer readable recording medium having embodied thereon a computer program for executing a method wherein the method includes: extracting vertex data corresponding to a preset processing unit to be processed next while vertex data is processed; if the processing of the vertex data being processed is finished, outputting the extracted vertex data; and processing the output vertex data.

According to another aspect of the present invention, there is provided a computer readable recording medium having embodied thereon a computer program for executing a method wherein the method includes: extracting vertex data corresponding to a preset processing unit to be processed next while a processor processes vertex data; temporarily storing the extracted vertex data; and if the processing of the vertex data in the processor is all finished, outputting the temporarily stored vertex data to a memory which temporarily stores data in order for the processor to process data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2A:
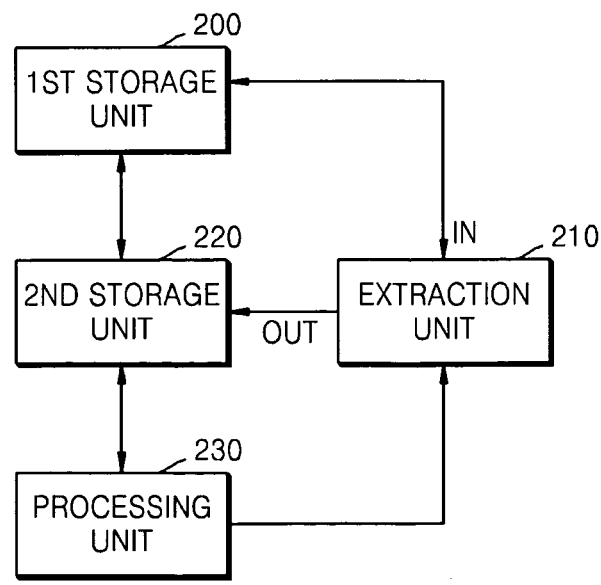
FIG. 2A is a block diagram illustrating an apparatus for processing vertex data according to an embodiment of the present invention.

FIG. 2A is a block diagram illustrating an apparatus for processing vertex data according to an embodiment of the present invention, and the apparatus includes a first storage unit 200, an extraction unit 210, a second storage unit 220, and a processing unit 230.

The first storage unit 200 is a storage medium externally disposed and stores vertex data. In this case, the vertex data means data including information on the position, normal, color, and texture coordinates of a vertex.

As an embodiment, the first storage unit 200 can be implemented with an external random access memory (RAM).

While vertex data stored in the second storage unit 220 and corresponding to a preset processing unit is being processed in the processing unit 230, the extraction unit 210 extracts vertex data corresponding to the preset processing unit to be processed next from the first storage unit 200 and temporarily stores the vertex data. Then, if all the vertex data stored in the second storage unit 220 is processed in the processing unit 230, the extraction unit 210 outputs the temporarily stored vertex data and writes the data in the second storage unit 210.

In this case, the preset processing unit means a unit that forms vertex data so that a processor can process vertex data in a loop. For example, in a 3D graphic geometry engine, the preset processing unit may be formed to be a triangle through continuous indexing relative to vertex data arbitrarily distributed in a memory.

This preset processing unit may be a batch including a plurality of triangles. However, the preset processing unit is not necessarily limited to the batch for execution. Hereinafter, assuming that the preset processing unit is a batch, embodiments of the present invention will be explained.

While the processing unit 230 processes an n-th batch stored in the second storage unit 220, the extraction unit 210 extracts an (n+1)-th batch from the first storage unit 200 and temporarily stores the (n+1)-th batch. If the n-th batch stored in the second storage unit 210 is all processed in the processing unit 230, the extraction unit 210 outputs the temporarily stored (n+1)-th batch and writes the (n+1)-th batch in the second storage unit 210.

When the extraction unit 210 outputs a batch to the second storage unit 210, if a trigger output by the processing unit 230 after processing all the batch stored in the second storage unit 220 is received as an input, the extraction unit 210 outputs the temporarily stored batch by a burst transfer method.

In other words, the processing unit 230 process the n-th batch stored in the second storage unit 210, and at the same time the extraction unit 210 extracts the (n+1)-th batch from the first storage unit 200 and temporarily stores the (n+1)-th batch. If the n-th batch is all processed, the processing unit 230 outputs the trigger to the extraction unit 210, and the extraction unit 20 outputs the temporarily stored (n+1)-th batch to the second storage unit by a burst transfer, thereby writing the (n+1)-th batch in the second storage unit 220.

Then, after outputting the (n+1)-th batch to the second storage unit 220, the extraction unit 230 extracts an (n+2)-th batch from the first storage unit 200, while the processing unit 230 processes the (n+1)-th batch. This process is repeatedly performed until all batches are processed.

The embodiment illustrated in FIG. 2A shows a case where the extraction unit 230 includes a function of a direct memory access controller (DMAC) and executes the DMAC function. A case where the extraction unit 230 does not include the DMAC function and a DMAC is separately disposed outside the extraction unit 230 will be explained later with reference to FIG. 3A.

Figure 2B:
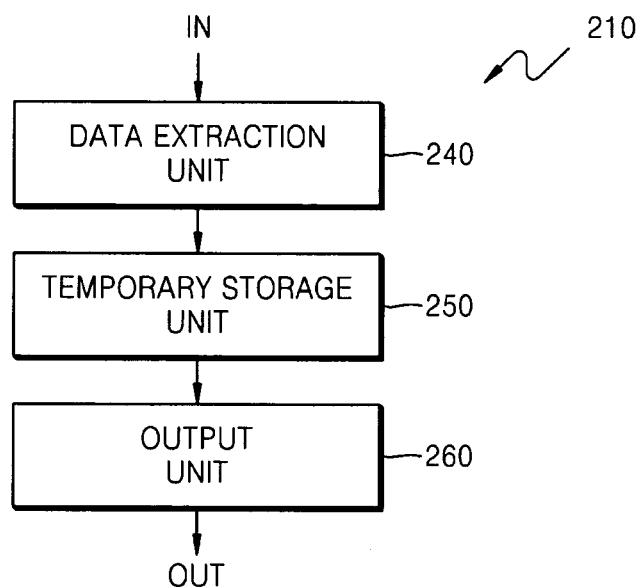
FIG. 2B is a block diagram illustrating an extraction unit included in an apparatus for processing vertex data according to an embodiment of the present invention.

FIG. 2B is a block diagram illustrating the extraction unit 210 included in the apparatus for processing vertex data according to an embodiment of the present invention. The extraction unit 210 includes a data extraction unit 240, a temporary storage unit 250, and an output unit 260.

The data extraction unit 240 extracts vertex data corresponding to a batch unit to be processed next, while the processing unit 230 processes vertex data in units of batches stored in the second storage unit 210.

The temporary storage unit 250 temporarily stores the batch extracted from the data extraction unit 240.

In response to a trigger output by the processing unit 230 after the batch stored in the second storage unit 210 is processed all, the output unit 260 outputs the batch temporarily stored in the temporary storage unit 250 to the second storage unit 210 by a burst transfer, and writes the batch in the second storage unit 210.

Referring again to the embodiment illustrated in FIG. 2A, the second storage unit 220 stores vertex data corresponding to the preset processing unit and output from the extraction unit 210. More specifically, in order for the processing unit 230 to process data in the preset unit the second storage unit 220 temporarily stores vertex data corresponding to the preset processing unit. The second storage unit 220 is implemented as a small-capacity storage medium having a high-speed memory function so that the processing unit 230 can copy or temporarily store information. As an embodiment, the second storage unit 220 may be implemented as a scratch pad memory (SPM).

The processing unit 230 processes the preset processing units of vertex data stored in the second storage unit 220. More specifically, the processing unit 230 applies transform or lighting to the vertex data stored in the second storage unit 220, and performs geometry calculation with respect to a vertex to be output on a screen as a center. Also, the processing unit 230 can perform even rasterization in which fragments formed in units of batches after performing the geometry calculation are processed as pixels.

Figure 4:
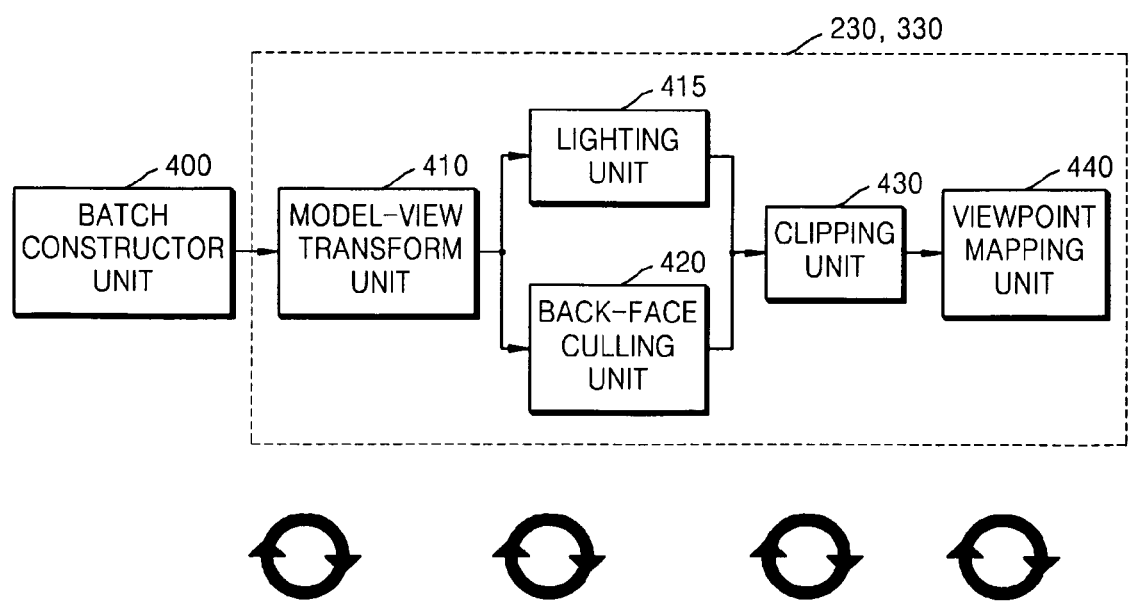
FIG. 4 is a block diagram illustrating part of a 3D graphics pipeline processing data in units of batches according to an embodiment of the present invention.

FIG. 4 is a block diagram illustrating a processing unit 230 performing only geometry calculations according to an embodiment of the present invention. The batch constructor unit 400 is an element including the extraction unit 210 and the second storage unit 220 described above with reference to FIG. 2A, and forms vertex data in units of batches. The processing unit 230 includes a model-view transform unit 410, a clipping unit 430, and a viewpoint mapping unit 440, and may selectively include a light unit 415, and a back-face culling unit 420.

Figure 1:
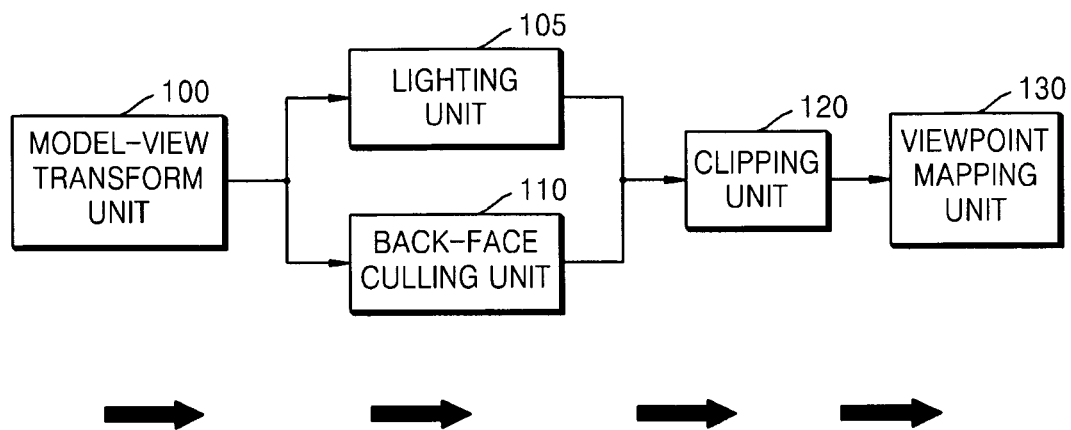
FIG. 1 is a block diagram of part of a 3 dimensional (3D) graphics pipeline according to conventional technology.

The model-view transform unit 410 transforms vertex data formed in units of batches in the batch constructor unit 400 into a 3D viewing coordinate system, and the lighting unit 415 applies light and reflectance to the 3D viewing system. The back-face culling unit 420 performs back-face culling. The clipping unit 430 removes vertex data that is not seen in a window view. The viewpoint mapping unit 440 performs viewpoint transform. Unlike the conventional 3D graphics pipeline illustrated in FIG. 1 in which each vertex data is processed according to the pipelined fashion of each element, the model-view transform unit 410, the lighting unit 415, the back-face culling unit 420, the clipping unit 430, and the viewpoint mapping unit 440 process vertex data in a loop fashion in units of batches formed in the batch constructor unit 400.

Figure 3A:
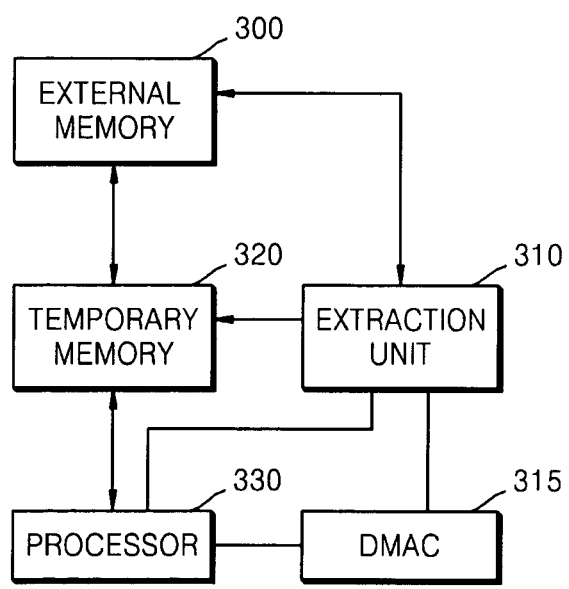
FIG. 3A is a block diagram illustrating an apparatus for processing vertex data according to another embodiment of the present invention.

FIG. 3A is a block diagram illustrating an apparatus for processing vertex data according to another embodiment of the present invention. The apparatus for processing vertex data includes an external memory 300, an extraction unit 310, a DMAC 315, a temporary memory 320, and a processor 330.

The external memory 300 is an external RAM disposed externally and stores vertex data. In this case, the vertex data means data including information on the position, normal, color, and texture coordinates of a vertex.

While vertex data corresponding to a batch unit stored in the temporary memory 320 is processed in the processor 330, the extraction unit 310 outputs an individual read request to the DMAC 315, thereby extracting vertex data corresponding to a batch unit to be processed next among vertex data stored in the external memory 300. Then, the extraction unit 310 temporarily stores vertex data in units of batches in a buffer. If a trigger from the processor 330 is received, the extraction unit 310 outputs a burst transfer request to the DMAC 315, thereby performing burst transfer of vertex data stored in units of batches in the buffer, to the temporary memory 320, and writing the data in the temporary memory 320.

In this case, a batch is an embodiment of a preset processing unit, and a unit formed by vertex data so that vertex data can be processed in a loop in a processor. For example, in a 3D graphic geometry engine, a batch may be formed to be a triangle through continuous indexing relative to vertex data arbitrarily distributed in a memory. However, the preset processing unit is not necessarily limited to a batch for execution.

Hereinafter, assuming that the preset processing unit is a batch, an embodiment of the present invention will be explained. While the processor 330 processes an n-th batch stored in the memory 320, the extraction unit 210 outputs an individual read request to the DMAC 315, thereby extracting an (n+1)-th batch from among vertex data stored in the external memory 300. Then, the extraction unit 310 temporarily stores the (n+1)-th batch in the buffer. In response to a trigger output from the processor 330 after processing the n-th batch all, the extraction unit 310 outputs a burst transfer request to the DMAC 315, thereby outputting the (n+1)-th batch stored in the buffer to the temporary memory 320 and writing the (n+1)-th batch in the temporary memory 320.

After outputting the (n+1)-th batch to the temporary memory 320, while the processor 330 processes the (n+1)-th batch, the extraction unit 310 extracts an (n+2)-th batch from the external memory 300. This process is repeatedly performed until all batches are processed.

Figure 3B:
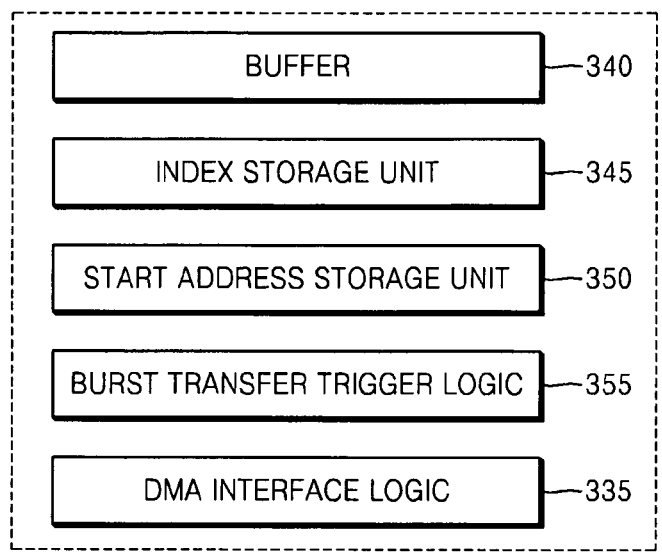
FIG. 3B is a block diagram illustrating an extraction unit included in an apparatus for processing vertex data according to an embodiment of the present invention.

FIG. 3B is a block diagram illustrating an extraction unit 310 included in an apparatus for processing vertex data according to an embodiment of the present invention. The extraction unit 310 includes a direct memory access (DMA) interface logic 335, a buffer 340, an index 345, a start address 350, and a burst transfer trigger logic 355.

While vertex data stored in the temporary memory 320 corresponding to a batch unit is processed in the processor 330, the DMA interface logic 335 outputs an individual read request to the DMAC 315, thereby retrieving vertex data corresponding to a batch unit to be processed next among vertex data stored in the external memory 300, and extracting the vertex data.

Also, the DMA interface logic 335 outputs a burst transfer request to the DMAC 315 in order to move vertex data stored in the buffer 340 corresponding to a batch unit from the buffer 340 to the temporary memory 320.

The buffer 340 temporarily stores vertex data corresponding to a batch unit to be processed next, which is retrieved and extracted by the DMAC 315. For example, a batch formed by vertex data stored in the buffer 340 may include the position of a vertex expressed as (x,y,z) coordinate values, the normal expressed as (x,y,z) vector values, the color expressed as (r,g,b,u) color values, and the texture coordinates expressed as (u,v) coordinate values.

The index storage unit 345 indexes vertex data forming a batch and stores an array of indexes.

The start address storage unit 350 stores physical addresses in the external memory 300 assigned to vertex data forming a batch.

In response to a trigger output by the processor 330 after processing all the batch stored in the temporary memory 320, the burst transfer trigger logic 355 outputs the batch formed by vertex data stored in the buffer 350, to the temporary memory 320.

A more specific example of the extraction unit 310 according to the current embodiment illustrated in FIG. 3B will now be explained.

First, while an n-th batch stored in the temporary memory 320 is processed in the processor 330, the DMA interface logic 335 outputs an individual read request to the DMAC 315, thereby retrieving an (n+1)-th batch to be processed next among vertex data stored in the external memory 300 and extracting the (n+1)-th batch.

The buffer 340 temporarily stores the (n+1)-th batch which is retrieved and extracted by the DMAC 315.

In response to a trigger by the processor 330 after processing all the n-th batch stored in the temporary memory 320, the burst transfer trigger logic 355 outputs the (n+1)-th batch stored in the buffer 350, to the temporary memory 320.

After the burst transfer trigger logic 355 outputs the (n+1)-th batch to the temporary memory, operations by the DMA interface logic 335, the buffer 340, and the burst transfer trigger logic 355 are performed for an (n+2)-th batch. In the same manner, the operations by the DMA interface logic 335, the buffer 340, and the burst transfer logic 355 are repeatedly performed.

In response to the individual read request output from the DMA interface logic 335 included in the extraction unit 310, the DMAC 315 enables the extraction unit 310 to retrieve vertex data corresponding to a batch unit to be processed next among vertex data stored in the external memory 300.

Also, in response to the burst transfer request output from the DMA interface logic 335 included in the extraction unit 310, the DMAC 315 moves vertex data corresponding to the batch unit stored in the buffer 340 disposed inside the extraction unit 310, to the temporary memory 320 from the buffer 340, and stores the vertex data in the temporary memory 320.

In this case, the DMAC 315 has a transmission circuit (channel) independent of the processor 330 and when data is transmitted, the DMAC 315 controls data to be exchanged directly between the external memory 300 and the extraction unit 310 in a direct memory access method.

Referring again to the embodiment illustrated in FIG. 3A, the temporary memory 320 is an SPM and temporarily stores a batch output from the extraction unit 310 so that the processor 330 can process data in the preset processing units.

The processor 330 processes in units of batches the vertex data which is stored in units of batches in the temporary memory 320. More specifically, the processor 330 applies transform or lighting to a batch stored in the temporary memory 320, and performs geometry calculation with respect to a vertex to be output on a screen as a center. Also, the processor 330 can perform even rasterization in which fragments formed in units of batches after performing the geometry calculation are processed as pixels.

FIG. 4 is a block diagram illustrating a processor 330 performing only geometry calculations according to an embodiment of the present invention. The batch constructor unit 400 is an element including the extraction unit 310 and the temporary memory 320 described above with reference to FIG. 3A, and forms vertex data in units of batches. The processor 330 includes a model-view transform unit 410, a clipping unit 430, and a viewpoint mapping unit 330, and may selectively include a light unit 415, and a back-face culling unit 420. The model-view transform unit 410 transforms vertex data formed in units of batches in the batch constructor unit 400 into a 3D viewing coordinate system, and the lighting unit 415 applies light and reflectance to the 3D viewing system. The back-face culling unit 420 performs back-face culling. The clipping unit 430 removes vertex data that is not seen in a window view. The viewpoint mapping unit 440 performs viewpoint transform. Unlike the conventional 3D graphics pipeline illustrated in FIG. 1 in which each vertex data is processed according to the pipelined fashion of each element, the model-view transform unit 410, the lighting unit 415, the back-face culling unit 420, the clipping unit 430, and the viewpoint mapping unit 440 process vertex data in a loop fashion in units of batches formed in the batch constructor unit 400.

Figure 5:
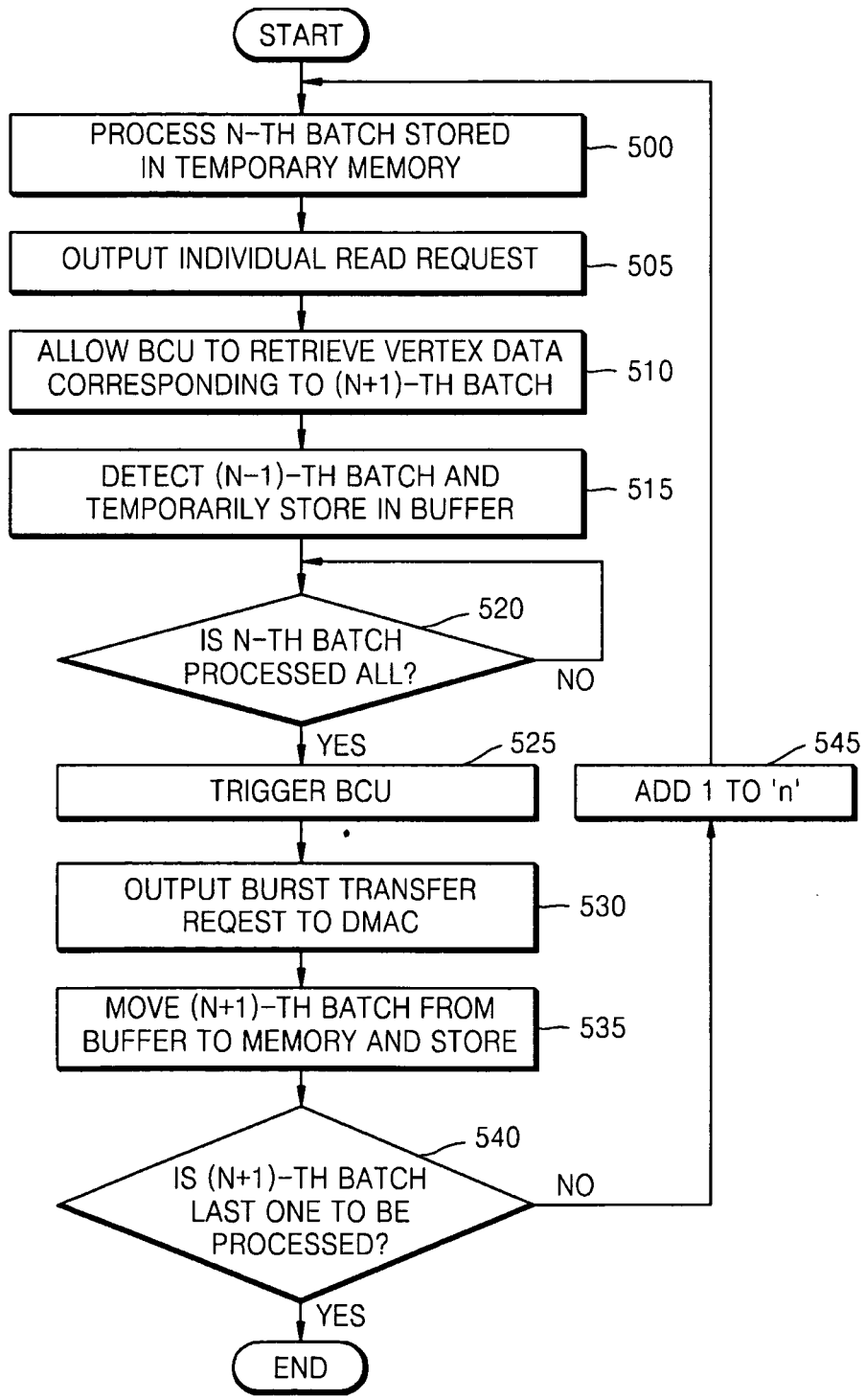
FIG. 5 is a flowchart illustrating a method of processing vertex data according to an embodiment of the present invention.

FIG. 5 is a flowchart illustrating a method of processing vertex data according to an embodiment of the present invention.

First, a processor processes an n-th batch stored in a temporary memory in operation 500.

In this case, a batch is an embodiment of a preset processing unit, and a unit formed by vertex data so that vertex data can be processed in a loop in a processor. For example, in a 3D graphic geometry engine, a batch may be formed to be a triangle through continuous indexing relative to vertex data arbitrarily distributed in a memory. However, the preset processing unit is not necessarily limited to a batch for execution.

The processor processes in units of batches the vertex data which is stored in units of batches in the temporary memory. More specifically, the processor applies transform or lighting to a batch stored in the temporary memory, and performs geometry calculation with respect to a vertex to be output on a screen as a center. Also, the processor can perform even rasterization in which fragments formed in units of batches after performing the geometry calculation are processed as pixels.

Also, the temporary memory is an SPM and temporarily stores a batch so that the processor 330 can process data in the preset processing units.

While the processor processes the n-th batch in operation 500, a batch constructor unit (BCU) outputs an individual read request to a DMAC in operation 505.

In this case, the DMAC has a transmission circuit (channel) independent of the processor and when data is transmitted, the DMAC controls data to be exchanged directly between an external memory and the BCU in a direct memory access method.

In response to the individual read request output in operation 505, the DMAC enables the BCU to retrieve vertex data corresponding to an (n+1)-th batch among vertex data stored in the external memory in operation 510.

By the DMAC performing operation 510, the BCU retrieves and extracts an (n+1)-th batch in the external memory, and temporarily stores the (n+1)-th batch in a buffer disposed inside the BCU in operation 515.

While the processor processes the n-th batch in operation 550, operations 505 through 515 are performed independently of operation 550.

In operation 520, it is determined whether or not the processor processes the n-th batch all in operation 500.

If it is determined in operation 520 that the processor finishes processing of the n-th batch, the processor triggers the BCU in operation 525.

The BCU triggered by the processor in operation 525 outputs a burst transfer request to the DMAC in operation 530.

In response to the burst transfer request output in operation 530, the DMAC moves an (n+1)-th batch stored in the buffer disposed inside the BCU to the temporary memory in a burst transfer method and stores the (n+1)-th batch in the temporary memory in operation 535.

After operation 535, it is determined whether or not the (n+1)-th batch is the last batch to be processed in operation 540.

If it is determined in operation 540 that a batch to be additionally processed exists, 1 is added to 'n' in operation 545 and operations 500 through 540 are repeatedly performed.

According to the apparatus for and method of processing vertex data, vertex data is processed in units of batches in a 3D graphics pipeline in a loop fashion, thereby allowing more efficient processing of the vertex data.

Also, although data is processed in units of batches in a 3D graphics pipeline, only an internal buffer with a small capacity is added and a DMA burst transfer function is linked. In this way, a processing time delayed from the time when the processor finishes processing of vertex data corresponding to a predetermined batch and to the time when the processor finishes forming of vertex data to be processed next can be reduced, thereby reducing required overhead for forming a batch.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The present invention can also be embodied as computer readable codes on a computer readable recording medium. The computer readable recording medium is any data storage device that can be thereafter read by a computer system. Examples of the computer readable recording medium include read-only memory (ROM), random-access memory (RAM), CD-ROMs, magnetic tapes, floppy disks, and optical data storage devices.

What is claimed is:

1. An apparatus for processing vertex data comprising:
a first storage unit to store vertex data;
a second storage unit to store vertex data corresponding to a batch among the stored vertex data;
a processing unit to simultaneously process the vertex data stored in the second storage unit in a loop for each element of rendering processing; and
an extraction unit to extract vertex data corresponding to the batch to be processed next in a loop from the first storage unit while the processing unit simultaneously processes the vertex data stored in the second storage unit in the loop for each element of rendering processing, and if all the vertex data stored in the second storage unit is processed, outputs the extracted vertex data to the second storage unit at a burst,
wherein the batch comprises triangles formed from continuously indexed vertex data that can be processed simultaneously in the loop.

2. The apparatus of claim 1, wherein the processing unit performs geometry calculation of the vertex data in the processing units or performs geometry calculation and rasterization of the vertex data.

3. The apparatus of claim 1, wherein the extraction unit comprises:
a data extraction unit to extract the vertex data corresponding to the processing unit to be processed next in the first storage unit while the processing unit processes the vertex data stored in the second storage unit;
a temporary storage unit to temporarily store the extracted vertex data; and
a transmission unit to output the temporarily stored vertex data to the second storage unit if the vertex data stored in the second storage unit is all processed.

4. The apparatus of claim 1, further comprising:
a batch constructor unit to retrieve, extract, and store vertex data in units of batches.

5. The apparatus of claim 1, further comprising:
an index storage unit to index vertex data forming a batch and store an array of indexes.

6. The apparatus of claim 1, wherein the second storage unit is a scratchpad memory of the processing unit.

7. An apparatus for processing vertex data comprising:
a storage unit to store vertex data;
a processing unit to simultaneously process vertex data corresponding to a batch in a loop for each element of rendering processing; and
an extraction unit to extract vertex data of an amount corresponding to the batch at a burst to be processed next in a loop from the stored vertex data while the processing unit simultaneously processes the vertex data,
wherein the batch comprises triangles formed from continuously indexed vertex data that can be processed simultaneously in the loop.

8. An apparatus for processing vertex data comprising:
a data extraction unit to extract vertex data corresponding to a batch at a burst to be processed next in a loop while vertex data is simultaneously processed in a processor in a loop for each element of rendering processing;
a temporary storage unit to temporarily store the extracted vertex data; and
an output unit, if the vertex data in the processor is all processed, to output the temporarily stored vertex data to a memory which temporarily stores data in order for the processor to simultaneously process the data in the loop for each element of rendering processing,
wherein the batch comprises triangles formed from continuously indexed vertex data that can be processed simultaneously in the loop.

9. The apparatus of claim 8, wherein when the temporarily stored vertex data is output to the memory, the output unit outputs the vertex data in a burst transfer method.

10. A method of processing vertex data comprising:
extracting, by a processor, vertex data corresponding to a batch at a burst to be processed next in a loop while vertex data is simultaneously processed in a loop for each element of rendering processing;
if the processing of the vertex data being processed is finished, outputting the extracted vertex data; and
simultaneously processing the output vertex data in the loop for each element of rendering processing,
wherein the batch comprises triangles formed from continuously indexed vertex data that can be processed simultaneously in the loop.

11. The method of claim 10, wherein in the processing of the output vertex data, geometry calculation of the vertex data in the processing units is performed or geometry calculation and rasterization of the vertex data are performed.

12. The method of claim 10, wherein in the outputting of the extracted data, the extracted data is output in a burst transfer method.

13. A method of extracting vertex data comprising:
extracting vertex data corresponding to a batch at a burst to be processed next in a loop while a processor simultaneously processes vertex data in a loop for each element of rendering processing;
temporarily storing the extracted vertex data; and
if the processing of the vertex data in the processor is all finished, outputting the temporarily stored vertex data to a memory which temporarily stores data in order for the processor to simultaneously process the data in the loop for each element of rendering processing,
wherein the batch comprises triangles formed from continuously indexed vertex data that can be processed simultaneously in the loop.

14. The method of claim 13, wherein in the outputting of the temporarily stored vertex data, the vertex data is output in a burst transfer method.

15. A non-transitory computer readable recording medium having embodied thereon a computer program for executing a method wherein the method comprises:
extracting vertex data corresponding to a batch at a burst to be processed next in a loop while vertex data is simultaneously processed in a loop for each element of rendering processing;
if the processing of the vertex data being processed is finished, outputting the extracted vertex data; and
processing the output vertex data,
wherein the batch comprises triangles formed from continuously indexed vertex data that can be processed simultaneously in the loop.

16. A non-transitory computer readable recording medium having embodied thereon a computer program for executing a method wherein the method comprises:
extracting vertex data corresponding to a batch at a burst to be processed next in a loop while a processor simultaneously processes vertex data in a loop for each element of rendering processing;
temporarily storing the extracted vertex data; and
if the processing of the vertex data in the processor is all finished, outputting the temporarily stored vertex data to a memory which temporarily stores data in order for the processor to simultaneously process the data in the loop for each element of rendering processing, wherein the batch comprises triangles formed from continuously indexed vertex data that can be processed simultaneously in the loop.

* * * * *